3,244,721
PROCESS FOR THE ARYLATION OF AN AROMATIC COMPOUND IN THE PRESENCE OF A CATALYST
Peter James Stratford Bain, Wrexham, and Ernest Bryson McCall, Llangollen, Wales, assignors to Monsanto Chemicals Limited, London, England, a British company
No Drawing. Filed Sept. 26, 1962, Ser. No. 226,433
Claims priority, application Great Britain, Oct. 10, 1961, 36,287/61; Mar. 16, 1962, 10,096/62
7 Claims. (Cl. 260—283)

This invention relates to a new process by which an aromatic compound can be arylated.

By arylation of a compound is meant the introduction of an aromatic group, that is to say the group remaining on removal of a nuclear hydrogen atom from a cyclic system that is stabilized by non-localized $\pi$-electrons, for instance, a phenyl group or a pyridyl group. A typical arylation is, for instance, the introduction of a phenyl group into diphenyl to produce a terphenyl.

The introduction of an aromatic group such as a phenyl group does, in principle, constitute an important reaction, and the formation of a terphenyl referred to above is, of course, only one example of the type of compound that can be produced. The terphenyls and other related compounds are, however, themselves valuable products by virtue of the fact that they are stable liquids at elevated temperatures. The terphenyls are of particular significance in that they are also materials which are stable to the effects of atomic radiation and which possess good neutron-moderating properties. They can accordingly be employed as functional fluids, for instance as moderator-coolants, in nuclear reactors.

In copending application Serial No. 150,120, filed November 6, 1961, there is disclosed a new arylation reaction that provides a valuable new route to many aromatic compounds. Such compounds are obtained in a relatively high state of purity and in the absence of large quantities of undesirable dark-colored by-products.

The process of the present invention is an improvement in or modification of that disclosed in said copending application, and is one for the arylation of an aromatic compound, in which the compound is heated with an arylating agent that is an aromatic substance containing linked to a nuclear carbon atom a sulfonyl halide group, a sulfonic acid group, or a sulfonic acid group in the form of a salt that decomposes at the reaction temperature. The improvement comprises carrying out the arylation in the presence of a catalyst which is a metal, a metal compound, an organic nitrogen compound, a polyhydric phenol, a quinone, or a compound containing an aliphatic group of six or more carbon atoms.

By means of the present invention, the rate at which a compound can be arylated is significantly increased relative to the rate of the same reaction in the absence of a catalyst. It follows that the range of organic compounds which can be arylated economically is considerably extended.

The aromatic compounds that can be arylated are compounds that possess a system that is stabilized by non-localized $\pi$-electrons, for instance, benzene, diphenyl, naphthalene, benzofuran or thiophene.

Particularly excellent results are obtained in the process when the substance employed as the arylating agent is an aromatic sulfonyl halide, particularly a chloride or bromide, or an aromatic sulfonic acid.

The process is normally carried out at an elevated temperature, for example, a temperature higher than 125° C., and preferably above 150° C. or 175° C. Good results are obtained using a reaction temperature in the range of 200° C. to 300° C., for instance, between 220° C. or 240° C. and 275° C. In practice, the requirement as to reaction temperature means that the process is particularly convenient for the arylation of aromatic compounds that are relatively high boiling, for example, diphenyl or diphenyl ether. In the instance of more volatile compounds, however, a high reaction temperature can be obtained by carrying out the process under a suitably elevated pressure.

The aromatic compounds that can be arylated include the carbocyclic compounds such as benzene and condensed benzenoid systems such as naphthalene, and aromatic compounds having a heterocyclic ring such as furan and thiophene. Nitrogen-containing aromatic compounds can be used, but where these are bases such as pyridine or quinoline, there is a likelihood of unwanted side reactions taking place, and the process is therefore less useful in respect of such aromatic bases. More than one type of ring can be present in the compound, as in the case of compounds such as benzothiophene or dibenzothiophene. Where, for instance, a compound contains two rings, the arylation can take place in either or both of them. In general, the aromatic compound can contain a substituent, for example an aliphatic group, for instance an alkyl or cycloalkyl group, such as a methyl, ethyl, octyl, nonyl or cyclohexyl group; an aromatic group, for instance an aryl group, such as a phenyl or tolyl group; a halogen atom, for example chlorine or bromine; a carboxylic ester group; an alkoxy group, for instance a methoxy, ethoxy, butoxy or hexyloxy group; or an aryloxy group, for instance a phenoxy or tolyloxy group. Specific examples of aromatic compounds, including substituted ones, are toluene, the xylenes, ethylbenzene, 2-methyl-2-phenyloctane, dodecylbenzene, diphenyl, o-, m- and p-terphenyl, quaterphenyl, 2-methyldiphenyl, 4-isopropyldiphenyl, 4,4'-di-isopropyldiphenyl, 1-methylnaphthalene, 1,6-dimethylnaphthalene, indene, anthracene, 3-ethylanthracene, chlorobenzene, bromobenzene, p-chlorotoluene, o-dichlorobenzene, 2-chloronaphthalene, 4-chlorodiphenyl, anisole, phenetole, diphenyl ether, 2-ethylthiophene, 2-phenylthiophene, thiophene-2-carboxylic ethyl ester, benzofuran, 4-methylbenzofuran, 5-bromobenzofuran, 6-methoxybenzofuran, 4-phenylbenzofuran, dibenzofuran, 1-cyclohexyldibenzofuran, 1-phenyldibenzofuran, 2,8-dichlorodibenzofuran, 2-ethoxybenzothiophene, 1-cyclohexyldibenzothiophene, 2-phenyldibenzothiophene, 4-bromodibenzothiophene and 2-phenoxydibenzothiophene.

The arylating agent is a substance containing an aromatic radical linked by a nuclear carbon atom to one of the specified groups, for instance the sulfonyl halide group, and, in principle, the aromatic radical can be one derived from any of the aromatic compounds referred to above as capable of being arylated in the process of the invention. In practice, the arylating agent is often one containing a relatively simple aromatic radical, such as, for instance, a phenyl, ethylphenyl, chlorophenyl or nitrophenyl radical. However, the arylating agent can, in general, be one containing a carbocyclic aromatic radical such as phenyl or a condensed benzenoid radical such as naphthyl, or an aromatic radical having a heterocyclic ring such as furyl, thienyl or pyridyl radical. More than one type of ring can be present; for instance, the radical can be benzothienyl, dibenzothienyl or quinolinyl. In general, the radical can contain a substituent, for example an aliphatic group, for instance an alkyl or cycloalkyl group, such as methyl, octyl, nonyl or cyclohexyl group; an aromatic group, for instance an aryl group, such as a phenyl or tolyl group; a halogen atom, for example chlorine or bromine; a nitro group; a carboxylic ester group, for instance a carbethoxy group; an alkoxy group, for instance a methoxy, ethoxy, butoxy or hexyloxy group; or an aryloxy group, for instance a phenoxy or tolyloxy group.

In general, the arylating agent can contain one or more of the specified groups, that is to say a sulfonyl halide group, a sulfonic acid group, or a sulfonic acid group in the form of a salt that decomposes at the reaction temperature; of these, the sulfonyl halide group is preferred. The arylating agent can, for instance, be a benzenesulfonyl halide or a benzenedisulfonyl halide. An example of an arylating agent containing a sulfonic acid group in the form of a salt that decomposes in the process to a free sulfonic acid group is an ammonium salt of an aromatic sulfonic acid. Specific examples of arylating agents are benzenesulfonyl chloride, toluenesulfonyl chloride, isopropylbenzenesulfonyl chloride, t-butylbenzenesulfonyl chloride, p-nitrobenzenesulfonyl chloride, pyridine-3-sulfonyl chloride, p - phenylbenzenesulfonylchloride, benzenesulfonyl bromide, m-benzenedisulfonyl chloride, 4,4'-diphenyldisulfonyl chloride, benzenesulfonic acid, naphthalenesulfonic acid, and ammonium benzenesulfonate.

The arylation reaction proceeds smoothly at the appropriate elevated temperature, and the presence of a solvent is not essential, although one can be employed if desired, particularly a high-boiling inert solvent such as hexachlorobenzene or some other perhalogenated substance.

One class of materials which will catalyze the arylation reaction are metals and metal compounds. Excellent results are obtained with copper, platinum and palladium and their respective compounds, and catalytic activity is also shown by sodium, potassium, calcium, cobalt, lead, manganese, mercury, silver, titanium and their respective compounds. Other metals or metal compounds can be used however.

A metal can be employed as such or in the form of an alloy with another metal. A metal compound can be, for instance, an oxide or hydroxide, a salt with an inorganic acid, such as a halide, sulfate, carbonate or nitrate, or a salt with an organic acid, for instance an acetate, oxalate, benzoate, naphthenate or benzenesulfinate. In other instances, the compound can be one where the metal is present in an anion, for example a chloropalladite or cobaltinitrite; one where the metal forms a "complex," for example with a nitrogen-containing compound, such as ammonia, dimethylamine, ethylene diamine or phthalocyanine, or with a diketone, such as acetylacetone; or one where the metal is bonded to carbon, for example a metal aryl or carbonyl. Specific examples of catalysts for the arylation reaction are the metals, copper, platinum, palladium, ruthenium, silver and sodium; brass; bronze; calcium naphthenate; cuprous chloride; cuprous bromide; cupric nitrate; cupric benzoate; copper naphthenate; cupric benzenesulfinate; cupric oleate; cuprammonium sulfate; copper phthalocyanine; cupric acetylacetone; platinum dioxide; platinum tetrachloride; potassium platinocyanide; chloroplatinic acid; palladous oxide; palladous chloride; potassium chloropalladite; cobaltous chloride; cobaltic fluoride; cobaltous carbonate; cobalt naphthenate; sodium cobaltinitrite; lead naphthenate; manganous chloride; manganese naphthenate; potassium permanganate; mercuric chloride; mercury diphenyl; silver nitrate; sodium benzenesulfonate; titanium tetrachloride; and bis- and tetrakis-(dimethylamino)-titanium. The naphthenates are usually supplied commercially as solutions in a moderately high-boiling petroleum solvent, for example white spirit, and for the purposes of the present invention, an appropriate quantity of such a solution can be added to the reactants.

Organic nitrogen compounds which can function as catalysts in the process of the invention include, for instance, amines, amine salts, amides, azo compounds, and nitro compounds.

An amine can be aliphatic or aromatic, primary, secondary or tertiary. Preferably it is one having a boiling point of at least 50° C. at atmospheric pressure. The aliphatic group (or groups) of an aliphatic amine can be, for example, an alkyl group having either a straight or branched chain, such as methyl, ethyl, isopropyl, sec.-butyl or a hexyl, octyl or dodecyl group, a cycloalkyl group, such as cyclohexyl, or an aralkyl group, such as benzyl. Useful aliphatic amines also include those where the nitrogen atom is a member of a ring, for example, a piperidine or morpholine ring, and those where the aliphatic group is one containing a substituent, for example, a halogen atom or a hydroxy group.

Specific examples of aliphatic amines which can be employed as catalysts in the process of the invention are triethylamine, di-n-propylamine, n-butylamine, di-sec.-butylamine, diethanolamine, 1,1,3,3-tetramethyl-n-butylamine, cyclohexylamine, N - methylcyclohexylamine, benzylamine, piperidine and morpholine.

Aromatic amines include those where the aromatic group (or groups) is an aryl group, for instance a phenyl, tolyl or naphthyl group, secondary or tertiary aromatic amines where the nitrogen atom is also linked to an aliphatic group, for instance the N-alkylanilines, and aromatic amines where the nitrogen atom is a member of a ring, for instance a pyridine or quinoline ring.

Specific examples of useful aromatic amines are N-ethylaniline, o-, m- and p-toluidine, diphenylamine, α- and β-naphthylamine and quinoline.

Optionally an amine can be employed in the form of one of its salts, for example, a salt with an inorganic acid, such as a chloride or sulfate; a salt with an organic acid, such as an acetate or benzene sulfonate; or a quaternary ammonium salt, for instance, a quaternary ammonium halide obtained by treating the free amine with an alkyl halide.

Where the organic nitrogen compound used as catalyst in the process of the invention is an amide, it can be, for instance, an amide of a carboxylic acid, for example an acetamide or benzamide, or an amide of a sulfonic acid. Amides of aromatic sulfonic acids such as benzenesulfonic acid and p-toluene sulfonic acid are very effective catalysts, especially where the sulfonamide group has the formula, —$SO_2NRR'$, in which R and R' can each be a hydrogen atom or an aryl group, for example, a phenyl or tolyl group. Specific examples of amides are benzamide, benzenesulfonamide, N-phenylbenzenesulfonamide, and N,N-diphenylbenzenesulfonamide.

Azo compounds which can function as catalysts in the process of the invention are preferably aromatic azo compounds where at least one nitrogen atom of the azo group is linked to an aromatic nucleus, for instance, an aryl nucleus such as phenyl or tolyl. Useful aromatic azo compounds include diazoamino aromatic compounds where a nitrogen atom of the azo group is linked to a nitrogen atom of an aromatic amine, and compounds where the azo group is reduced, that is to say hydrazo derivatives. Specific examples of these compounds are azobenzene, aminoazobenzene, hydrazobenzene and diazoaminobenzene.

Nitro compounds which catalyze the arylation reaction are, in general, those where a nitro group is linked to an aromatic nucleus; this can be carbocyclic, for example a benzene or naphthalene nucleus, or heterocyclic, for example a quinoline nucleus. Polynitro compounds, for example those containing two, three or four nitro groups such as 2,4,6-trinitrobenzene, are very active catalysts.

Catalytic polyhydric phenols include, for example, polyhydroxybenzenes and polyhydroxynaphthalenes. Preferred members of the class are di- and tri-hydric phenols, such as, for instance, hydroquinone and pyrogallol.

Catalytic quinones include, for example, benzoquinones and naphthoquinones, and are preferably 1,4-quinones such as 1,4-benzoquinones.

Where the catalyst is a compound containing an aliphatic group of six or more carbon atoms, this group is preferably one where the carbon atoms are arranged in a straight or branched chain, although, in certain instances, it can be, or can contain, a cycloaliphatic system. The aliphatic group can be saturated or unsaturated. With regard to the number of carbon atoms in the group, a preferred range is from about 8 to about 25, for example, about 10 to about 20. Often a catalyst of this class is a relatively simply aliphatic compound, either saturated or containing one or two ethylenic bonds; for example, a hydrocarbon, such as propylene tetramer, n-hexadecane or n-octadecane; a halogeno hydrocarbon, such as tetradecyl chloride; an alcohol, such as cetyl alcohol, or oleyl alcohol; a carboxylic acid, such as palmitic acid, stearic acid or oleic acid; an ester, such as lauryl acetate or ethyl caprate; or an ether, such as butyl lauryl ether or dicetyl ether. Excellent results are obtained using a hydrocarbon or an acid. Where a catalyst contains a cycloaliphatic group, this can be such as a cyclohexyl or cyclo hexadienyl group, and an example of such a catalyst is 3-methyl-2,4,4,5,6-pentachlorocyclohexa-2,5-dienone.

Good results are obtained when, relative to the quantity of the arylating agent, the quantity of the compound to be arylated in the process is large; the excess can, for example, be 5 to 25 times the molar equivalent, for instance about 10 to 20 times. However, a smaller excess, for example two or three time the molar equivalent, or equimolecular proportions, can be employed. Moreover, particularly where it is desired to arylate the compound in more than one position, it is sometimes appropriate to employ an excess of the arylating agent.

The quantity of catalyst employed in the process of the invention can vary over a wide range. There can be employed, for instance, as much as 0.5 gram mol (or gram atom) of catalyst per gram mol of arylating agent. Generally, much smaller quantities than this are satisfactory, and in certain instances, as little as 0.0001 gram mol (or gram atom) of catalyst per gram mol of arylating agent can be effective. The preferred number of gram mols (or gram atoms) of catalyst per gram mol of arylating agent is generally within a range of about 0.001 to about 0.1, for instance, 0.005, 0.01 or 0.05. Excellent results are obtained using 0.1 gram mol (or gram atom) of catalyst per gram mol of arylating agent.

The products of the process of the invention are, in many instances, a mixture of isomers; appropriate arylation of diphenyl, for example, gives a mixture of o-, m- and p-terphenyl. In many instances, such as for use as a functional fluid, it is not essential that such isomers should be separated from each other, but simply that, for example, they should be isolated as a mixture from unchanged starting materials. If necessary, however, it is normally practical to separate a mixture of isomers, for example, by fractional distillation or possibly by fractional crystallization.

The process of the invention is illustrated by the following examples:

*Example 1*

This example illustrates the catalytic effect of copper, and of compounds of copper and of mercury, on the rate of reaction of benzenesulfonyl chloride with diphenyl in the production of terphenyls.

In each instance, the reaction was carried out by boiling a mixture of 231 grams (1.5 mols) of diphenyl, 19 grams (0.11 mol) of benzenesulfonyl chloride, and the appropriate amount of catalyst (which was present in finely-divided form) under reflux at atmospheric pressure. The reaction temperature was about 255–260° C. A slow stream of nitrogen was led under the surface of the mixture, and the off-gases, containing the hydrogen chloride and sulfur dioxide produced during the reaction, were passed into absorbers containing a standard sodium hydroxide solution. The course of the reaction was followed by analyzing, at intervals, the contents of the absorbers to determine the quantities of hydrogen chloride and sulfur dioxide which had been evolved. A control experiment was carried out similarly but in the absence of catalyst.

The results given in the following table show the marked increase in reaction rate which occurred in the presence of a catalyst.

| Catalyst | Amount in mols per mol of benzenesulfonyl chloride | Time for 50 percent reaction, minutes | Time (A) for essentially complete reaction, minutes | Percent of theoretical SO$_2$ evolved at time (A) | Percent of theoretical HCl evolved at time (A) |
|---|---|---|---|---|---|
| Precipitated copper | 0.01 | 21 | <120 | 96 | 96 |
| Copper bronze | 0.01 | 25 | <120 | 94 | 94 |
| Cuprous chloride | 0.01 | 23 | <120 | 97 | 96 |
| Cupric chloride dihydrate | 0.01 | 21 | <120 | 97 | 87 |
| Copper phthalo cyanine | 0.01 | 13.5 | 40 | 99 | 92 |
| Mercury diphenyl | 0.01 | 38 | 120 | 82 | 87 |
| None | | 80 | 240 | 92 | 94 |

*Example 2*

This example illustrates the catalytic effect of metallic silver, of further compounds of copper, and of compounds of palladium and of platinum on the rate of reaction of benzenesulfonyl chloride with diphenyl in the production of terphenyls, using a batch of diphenyl having a different reactivity compared with the diphenyl sample employed in Example 1. The experimental procedure was the same as that of Example 1. In each instance, 0.01 mol of catalyst was used per mol of benzenesulfonyl chloride.

| Catalyst | Time for 50 percent reaction, minutes | Time (A) for essentially complete reaction, minutes | Percent of theoretical SO$_2$ evolved at time (A) | Percent of theoretical HCl evolved at time (A) |
|---|---|---|---|---|
| Silver | 39 | 80 | 90 | 90 |
| Cupric benzoate | 23 | 70 | 98 | 96 |
| Copper naphthenate | 6 | 30 | 90 | 94 |
| Cupric benzenesulfinate | 22 | 80 | 100 | 98 |
| Cupric acetylacetone | 16.5 | 60 | 100 | 95 |
| Palladium dichloride | 8 | 30 | 93 | 1 79 |
| Chloroplatinic acid | 19 | 60 | 95 | 100 |
| None | 57 | 160 | 95 | 94 |

1 Some chlorobenzene was also produced.

Example 3

This example illustrates the catalytic effect of different concentrations of cuprous chloride on the rate of reaction of benzenesulfonyl chloride with diphenyl ether in the production of phenylated diphenyl ether.

The reaction was carried out by boiling a mixture of 170 grams (1.0 mol) of diphenyl ether and 17.6 grams (0.1 mol) of benzenesulfonyl chloride in the presence of the appropriate amount of cuprous chloride under reflux at atmospheric pressure. The reaction temperature was about 255–260° C. The course of the reaction was followed in the manner described in Example 1. The results given in the following table show, in the presence of cuprous chloride, the rate of reaction was several times that in a control experiment where cuprous chloride was absent.

| Amount of catalyst based on benzene sulfonyl chloride, molar percent | Time for 50 percent reaction minutes | Time (A) for essentially complete reaction, minutes | Percent of theoretical $SO_2$ evolved at time (A) | Percent of theoretical HCl evolved at time (A) |
|---|---|---|---|---|
| 0.5 | 28 | 140 | 87.9 | 83.9 |
| 1.0 | 18 | 100 | 92.7 | 89.1 |
| 2.0 | 21 | 120 | 93.6 | 83.7 |
| None | 144 | 340 | 99 | 81 |

Example 4

This example describes the production of terphenyls from diphenyl and benzenesulfonyl bromide in the presence of cuprous chloride.

A mixture of 11 grams (0.05 mol) of benzenesulfonyl bromide, 16 grams (0.75 mol) of diphenyl, and 50 milligrams (0.0005 mol) of cuprous chloride was boiled under reflux at a temperature of about 255° C. for five hours. Sulfur dioxide and hydrogen bromide were evolved.

When the reaction was complete, excess diphenyl was distilled from the reaction mixture; distillation of the residue at a pressure of 0.15 mm. of mercury gave 6.9 grams of mixed terphenyl isomers. p-terphenyl, having a melting point of 210–214° C., was isolated from the mixture by recrystallization from chloroform.

Example 5

This example describes the production of 2,4,6-tribromodiphenyl from 1,3,5-tribromobenzene and benzenesulfonyl chloride in the presence of cuprous chloride.

A mixture of 6.7 grams (0.038 mol) of benzenesulfonyl chloride, 112.6 grams (0.36 mol) of 1,3,5-tribromobenzene, and 40 milligrams (0.0004 mol) of cuprous chloride was heated under reflux at 250–260° C. for four hours.

Excess tribromobenzene was then distilled from the reaction mixture; distillation of the residue at a pressure of 0.35 mm. of mercury gave, as the main fraction, an oil having a boiling point of 147° C. On standing, the oil deposited a small amount of unidentified crystalline material. This was separated by diluting the oil with petroleum ether of boiling range 60° C. to 80° C. (in which the crystalline material was insoluble) and filtering. The filtrate was chromatographed on a column of alumina; evaporation of the solvent from the main eluate from the column gave 6.5 grams of crude 2,4,6-tribromodiphenyl having a melting point of about 60° C. A sample recrystallized from methanol had a melting point of 62.5–63.5° C. and gave the following elementary analysis.

Found: C, 37.2, 37.15; H, 1.7, 1.83; Br, 61.48. $C_{12}H_7Br_3$ requires: C, 36.85; H, 1.8; Br, 61.35%.

Example 6

This example describes the production of the new compound, 2,3,5,6-tetrachlorodiphenyl, by the arylation of 1,2,4,5-tetrachlorobenzene with benzenesulfonyl chloride in the presence of cuprous chloride. Said compound is useful as a dielectric material. It can also be further arylated to produce the corresponding terphenyls.

A mixture of 28.05 grams (0.16 mol) of benzenesulfonyl chloride, 503 grams (2.33 mols) of 1,2,4,5-tetrachlorobenzene, and 160 milligrams (0.0016 mol) of cuprous chloride was boiled under reflux at atmospheric pressure. The reaction temperature was about 250° C. After 7½ hours, 50% of the theoretical total of sulfur dioxide had been evolved. The reaction mixture was fractionally distilled; after removal of the excess 1,2,4,5-tetrachlorobenzene and benzene sulfonyl chloride, there remained 12.5 grams of a solid residue. Recrystallization of this residue from a mixture of methanol and benzene gave 2,3,5,6-tetrachlorodiphenyl as colorless crystals having a melting point of 75–77° C.

Example 7

This example describes the phenylation of m-diphenoxybenzene with benzenesulfonyl chloride in the presence of cuprous chloride.

A mixture of 6.6 grams (0.037 mol) of benzenesulfonyl chloride, 99 grams (0.38 mol) of m-diphenoxybenzene, and 30 milligrams (0.0003 mol) of cuprous chloride was heated under reflux at 250–260° C. for 3½ hours.

Excess m-diphenoxybenzene was distilled from the reaction mixture at a pressure of 0.8 mm. of mercury. Distillation of the residue at a pressure of 0.3 mm. of mercury gave 7.5 grams of an oil having a boiling range of 260–270° C., of which the main components were isomeric monophenylated m-diphenoxybenzenes.

Example 8

This example describes the production of phenyldibenzofurans from dibenzofuran and benzenesulfonyl chloride in the presence of cuprous chloride.

A mixture of 168 grams (1.0 mol) of dibenzofuran, 17.6 grams (0.1 mol) of benzenesulfonyl chloride, and 50 milligrams (0.0005 mol) of cuprous chloride was heated to 250° C. over a period of about one hour, and was then maintained at about this temperature for a further 35 minutes.

Excess dibenzofuran was distilled from the reaction mixture; distillation of the residue gave 13.8 grams of oil having a boiling range of 140–160° C. at a pressure of 0.04 mm. of mercury, consisting essentially of a mixture of 1-, 2-, 3- and 4-phenyldibenzofurans.

Example 9

This example illustrates the catalytic effect of piperidine, diphenylamine, α-naphthylamine and quinoline on the rate of reaction of benzenesulfonyl chloride with diphenyl in the production of terphenyls.

The procedure employed was similar to that described in Example 1, using, in each instance, 231 grams (1.5 mols) of diphenyl, 19 grams (0.11 mol) of benzenesulfonyl chloride, and 0.0011 mol of the amine.

The results given in the following table show that the rate of reaction was, in each instance, increased several times the presence of the amine.

| Catalyst | Time for 50 percent reaction, minutes | Time (A) for essentially complete reaction, minutes | Percent of theoretical SO₂ evolved at time (A) | Percent of theoretical HCl evolved at time (A) |
|---|---|---|---|---|
| Piperidine | 12.5 | 55 | 94 | 96 |
| Diphenylamine | 17 | 85 | 98 | 92 |
| α-Naphthylamine | 17 | 80 | 100 | 94 |
| Quinoline | 22 | 90 | 99 | 98 |
| None | 80 | 240 | 92 | 94 |

*Example 10*

This example describes the production of 2,5-dibromodiphenyl from 1,4-dibromobenzene and benzenesulfonyl chloride in the presence of diphenylamine.

A mixture of 17.4 grams (0.098 mol) of benzenesulfonyl chloride, 354 grams (1.5 mols) of 1,4-dibromobenzene, and 170 milligrams (0.001 mol) of diphenylamine was boiled under reflux at a temperature of 218–219° C. for 30 hours.

Excess dibromobenzene was then distilled from the reaction mixture; by fractional distillation of the residue, a fraction 18.3 grams in weight and having a boiling range of 140–150° C. at a pressure of 1 mm. of mercury, consisting essentially of 2,5-dibromodiphenyl, was isolated. This solidified on cooling, and crystals of 2,5-dibromodiphenyl, having a melting point of 40.5–42.5° C., were obtained from it by recrystallization from methanol.

*Example 11*

This example illustrates the catalytic effect of benzenesulfonimide, N-phenylbenzenesulfonamide, N,N-diphenylbenzene sulfonimide, diazoaminobenzene, and 2,4,6-trinitrobenzene on the rate of reaction of benzenesulfonyl chloride with diphenyl in the production of terphenyls.

The procedure employed was similar to that described in Example 1, using, in each case, 1.5 mols of diphenyl, 0.11 mol of benzenesulfonyl chloride, and 0.0011 mol of the catalyst.

The catalytic effect is apparent from the results given in the following table.

| Catalyst | Time for 50 percent reaction, minutes | Time (A) for essentially complete reaction, minutes | Percent of theoretical SO₂ evolved at time (A) | Percent of theoretical HCl evolved at time (A) |
|---|---|---|---|---|
| Benzene sulfonamide | 43 | 120 | 96 | 94 |
| N-Phenylbenzenesulfonamide | 27 | 100 | 95 | 93 |
| N,N-Diphenylbenzenesulfonamide | 23 | 120 | 98 | 95 |
| Diazoaminobenzene | 25 | <120 | 99 | 90 |
| 2,4,6-trinitrobenzene | 22 | 100 | 97 | 95 |
| None | 80 | 240 | 92 | 94 |

*Example 12*

This example illustrates the catalytic effect of hydroquinone and benzoquinone on the rate of reaction of benzenesulfonyl chloride with diphenyl in the production of terphenyls.

The procedure employed was similar to that described in Example 1, using, in each instance, 231 grams (1.5 mols) of diphenyl, 19 grams (0.11 mol) of benzenesulfonyl chloride, and a quantity of catalyst as indicated in the table below.

The results show that the rate of reaction was increased several times by the presence of hydroquinone or benzoquinone.

| Catalyst | Amount in mols per mol of benzenesulfonyl chloride | Time for 50 percent reaction, minutes | Time (A) for essentially complete reaction, minutes | Percent of theoretical SO₂ evolved at time (A) | Percent of theoretical HCl evolved at time (A) |
|---|---|---|---|---|---|
| Hydro-quinone | 0.01 | 24 | 90 | 98 | 95 |
| Hydro-quinone | 0.05 | 21 | 60 | 94 | 92 |
| Benzo-quinone | 0.01 | 31 | 80 | 95 | 91 |
| None |  | 80 | 240 | 92 | 94 |

*Example 13*

This example illustrates the catalytic effect of calcium naphthenate, lead naphthenate, propylene tetramer, octadecane, stearic acid, and oleic acid on the rate of reaction of benzenesulfonyl chloride with diphenyl in the production of terphenyl.

In each instance, the reaction was carried out by boiling a mixture of 231 grams (1.5 mols) of diphenyl, 19 grams (0.11 mol) of benzenesulfonyl chloride, and 0.0011 gram mol of catalyst under reflux at atmospheric pressure. The reaction temperature was about 255–260° C. A slow stream of nitrogen was led under the surface of the mixture, and the off-gases, containing hydrogen chloride and sulfur dioxide produced during the reaction, were passed into absorbers containing a standard sodium hydroxide solution. The course of the reaction was followed by analyzing, at intervals, the contents of the absorbers to determine the quantities of hydrogen chloride and sulfur dioxide that had been evolved. A control experiment was carried out similarly but in the absence of a catalyst.

The results given in the following table show the marked increase in reaction rate which occurred in the presence of a catalyst.

| Catalyst | Time for 50 percent reaction, minutes | Time (A) for essentially complete reaction, minutes | Percent of theoretical SO₂ evolved at time (A) | Percent of theoretical HCl evolved at time (A) |
|---|---|---|---|---|
| Calcium naphthenate [1] | 23 | 45 | 98 | 96 |
| Lead naphthenate [2] | 14 | 50 | 94 | 95 |
| Propylene tetramer | 9 | 40 | 99 | 95 |
| Octadecane | 18 | 50 | 99 | 96 |
| Stearic acid | 11.5 | 50 | 98 | 93 |
| Oleic acid | 11.5 | 40 | 99 | 94 |
| Manganese naphthenate [3] | 21 | 40 | 95 | 97 |
| None | 57 | 160 | 95 | 94 |

[1] Added as a solution in white spirit containing 4 percent by weight of calcium.
[2] Added as a solution in white spirit containing 24 percent by weight of lead.
[3] Added as a solution in white spirit containing 6 percent by weight of the metal.

*Example 14*

This example illustrates the catalytic effect of metallic platinum and ruthenium, and of further compounds of copper, titanium, sodium, and manganese on the rate of reaction of benzenesulfonyl chloride with diphenyl in the production of terphenyls.

The experimental procedure described in Example 2 was followed, using the same batch of diphenyl. In each instance, 0.01 mol of catalyst was used per mol of benzenesulfonyl chloride.

| Catalyst | Time for 50 percent reaction, minutes | Time (A) for essentially complete reaction, minutes | Percent of theoretical SO₂ evolved at time (A) | Percent of theoretical HCl evolved at time (A) |
|---|---|---|---|---|
| Titanium tetrachloride | 49 | 110 | 90 | 90 |
| bis(dimethyl-amino)titanium chloride | 26 | 140 | 99 | 98 |
| tatrakis(Di-methylamino)-titanium | 24 | 140 | 81 | 89 |
| 5 percent platinum on carbon | 23 | 90 | 52 | 78 |
| 5 percent ruthenium on carbon | 25 | 90 | 79 | 90 |
| Sodium benzene sulfonate | 42 | 130 | 99 | 95 |
| Cuprous bromide | 22.5 | 65 | 97 | 95 |
| Cupric oleate | 8 | 30 | 95 | 95 |
| Manganese chloride | 32 | 100 | 90 | 90 |
| None | 57 | 160 | 95 | 94 |

While the invention has been described herein with regard to several specific embodiments, it is not so limited. It is to be understood that modifications and variations of the invention, obvious to those skilled in the art, may be made without departing from the spirit and scope of said invention.

The embodiments of the invention in which an exclusive property or privilege is claimed are defined as follows:

1. In a process for replacing a hydrogen atom on a nuclear carbon atom of an aromatic compound with an aryl group, said aryl group being selected from the class consisting of phenyl, alkylphenyl, alkoxyphenyl, nitrophenyl, halophenyl, naphthyl, diphenylyl, pyridyl, quinolinyl, furyl, thienyl and mono- and dibenzo-furyl and thienyl, and said aromatic compound being selected from the class consisting of:
   benzene, indene, anthracene, naphthalene and diphenyl;
   alkyl-, alkoxy- and halo-benzene, anthracene, naphthalene and diphenyl;
   terphenyl, quaterphenyl, diphenyl ether, anisole and phenetole;
   furan, thiophene and mono- and dibenzo furan and thiophene;
   alkyl-, alkoxy-, halo-, cycloalkyl- and phenyl-furan, thiophene and mono- and dibenzo-furan and thiophene; and
   quinoline and pyridine;
said process comprising heating said aromatic compound with a compound of the formula $RZ_a$, where $a$ is an integer from 1 to 2, R represents said aryl group, and Z is selected from the class consisting of —SO₂OH, the ammonium salt of —SO₂OH, and —SO₂X, where X represents halogen, each radical represented by Z being attached to a nuclear carbon atom of R; the improvement which comprises carrying out said heating in the presence of a member of the class consisting of:
   copper, cupric and cuprous halides and the hydrates thereof, copper bronze, cupric nitrate and cuprammonium sulfate;
   platinum and palladium, and the oxides, the halides, the halometallic acids, the sodium and potassium salts of such acids, and the sodium and potassium metallocyanides thereof;
   silver and silver nitrate;
   ruthenium;
   manganese halide, and sodium and potassium permanganate;
   mercury halide;
   cobalt halide, cobalt carbonate and cobaltinitrile; and
   titanium tetrahalide.

2. In a process for replacing a hydrogen atom on a nuclear carbon atom of an aromatic compound with an aryl group, said aryl group being selected from the class consisting of phenyl, alkylphenyl, alkoxyphenyl, nitrophenyl, halophenyl, naphthyl, diphenylyl, pyridyl, quinolinyl, furyl, thienyl and mono- and dibenzo furyl and thienyl, and said aromatic compound being selected from the class consisting of:
   benzene, indene, anthracene, naphthalene and diphenyl;
   alkyl-, alkoxy-, and halo-benzene, anthracene, naphthalene and diphenyl;
   terphenyl, quaterphenyl, diphenyl ether, anisole and phenetole;
   furan, thiophene and mono- and dibenzo furan and thiophene;
   alkyl-, alkoxy-, halo-, cycloalkyl- and phenyl-furan, thiophene and mono- and dibenzo-furan and thiophene; and
   quinoline and pyridine;
said process comprising heating said aromatic compound with a compound of the formula $RZ_a$, where $a$ is an integer from 1 to 2, R represents said aryl group, and Z is selected from the class consisting of —SO₂OH, the ammonium salt of —SO₂OH, and —SO₂X, where X represents halogen, each radical represented by Z being attached to a nuclear carbon atom of R; the improvement which comprises carrying out said heating in the presence of a member of the class consisting of:
   cupric benzoate, copper naphthenate, cupric benzenesulfinate, cupric acetylacetone, cupric oleate and copper phthalocyanine;
manganese naphthenate;
calcium naphthenate and lead naphthenate;
mercury diphenyl;
cobalt naphthenate;
bis and tetrakis(dimethylamino)titanium;
sodium and potassium benzene sulfonate;
polyhydroxybenzene;
benzoquinone and naphthoquinone;
di-, tri- and tetranitro-benzene;
mono-, di- and trialkyl-amine wherein each alkyl group contains up to 12 carbon atoms;
azo-, aminoazo-, hydrazo- and diazoamino-benzene;
acetamide, benzamide, benzenesulfonamide, and N-phenyl- and N,N-diphenyl-benzene sulfonamide;
piperidine, pyridine, morpholine and quinoline;
aniline, toluidine, naphthylamine and diphenylamine; and
alkane, alkene and alkanoic monocarboxylic acid from 6 to 25 carbon atoms.

3. The process defined in claim 1 wherein the aromatic compound to be arylated and the compound of the formula, $RZ_a$, are heated at a temperature of from about 125° C. to 300° C.

4. The process defined in claim 1 wherein said improvement further comprises employing said member in an amount of from 0.0001 to 0.5 mol per mol of said compound of the formula, $RZ_a$.

5. The process defined in claim 1 wherein said improvement further comprises employing said member in an amount of from 0.001 to 0.1 mol per mol of said compound of the formula, $RZ_a$.

6. A process as defined in claim 1 wherein said member is cuprous chloride.

7. A process as defined in claim 2 wherein said member is diphenylamine.

References Cited by the Examiner
UNITED STATES PATENTS 2,977,516   3/1961   Weingarten _____ 260—649

WALTER A. MODANCE, *Primary Examiner.*

LEON ZITVER, NICHOLAS S. RIZZO, *Examiners.*

J. M. FORD, K. H. JOHNSON, *Assistant Examiners.*